United States Patent
Suzuki et al.

(10) Patent No.: US 9,002,620 B2
(45) Date of Patent: Apr. 7, 2015

(54) INTAKE AIR CONTROL APPARATUS FOR VEHICULAR INTERNAL COMBUSTION ENGINE

(75) Inventors: Hiroyuki Suzuki, Yokohama (JP); Hiraku Ooba, Yokohama (JP); Shinobu Kamada, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 274 days.

(21) Appl. No.: 12/866,542

(22) PCT Filed: Mar. 5, 2009

(86) PCT No.: PCT/IB2009/000443
§ 371 (c)(1),
(2), (4) Date: Aug. 6, 2010

(87) PCT Pub. No.: WO2009/109845
PCT Pub. Date: Sep. 11, 2009

(65) Prior Publication Data
US 2011/0015849 A1    Jan. 20, 2011

(30) Foreign Application Priority Data
Mar. 7, 2008 (JP) .................................. 2008-057272

(51) Int. Cl.
*F01L 1/34* (2006.01)
*F02D 13/02* (2006.01)
*F02D 41/00* (2006.01)

(52) U.S. Cl.
CPC ........ *F02D 13/0226* (2013.01); *F02D 41/0002* (2013.01); *Y02T 10/42* (2013.01); *Y02T 10/18* (2013.01)

(58) Field of Classification Search
CPC . Y02T 10/18; F02D 13/0207; F01L 13/0021; F01L 13/053; F01L 13/185
USPC ........... 123/90.11, 90.15, 316, 320–322, 325, 123/345–348, 481, 493; 701/102–104, 110, 701/114
See application file for complete search history.

(56) References Cited

U.S. PATENT DOCUMENTS 3,626,367 A * 12/1971 Howard et al. ............... 340/462
3,786,792 A * 1/1974 Pelizzoni et al. ............. 123/321
(Continued)

FOREIGN PATENT DOCUMENTS

JP    2002-89301    3/2002
JP    2002-256905    9/2002
(Continued)

*Primary Examiner* — Hai Huynh
*Assistant Examiner* — Gonzalo Laguarda
(74) *Attorney, Agent, or Firm* — Drinker Biddle & Reath LLP

(57) ABSTRACT

An apparatus is provided for controlling an intake valve of a vehicular internal combustion engine. The apparatus includes a variable valve operating mechanism configured to vary a valve lift and a valve phase angle of the intake valve, and a controller. The controller calculates a desired first target value at a current engine operating condition, a reacceleration estimated value based on an engine rotational speed and estimated operating load upon reacceleration, and a second target value at which engine torque is equivalent to engine torque at the first target value. The controller sets the first target value as a control target value, and then switches the control target value to the second target value when a minimum clearance between the intake valve and a piston is determined to become less than a permissible value during variation of the intake valve from the first target value toward the reacceleration estimated value.

12 Claims, 6 Drawing Sheets

(56) References Cited

U.S. PATENT DOCUMENTS

| | | | |
|---|---|---|---|
| 6,092,495 A * | 7/2000 | Hackett | 123/90.15 |
| 6,202,628 B1 * | 3/2001 | Iwano et al. | 123/339.16 |
| 6,626,144 B1 * | 9/2003 | Kanamaru | 123/399 |
| 6,655,345 B2 | 12/2003 | Ogawa et al. | |
| 6,772,731 B2 | 8/2004 | Miura | |
| 7,003,391 B2 * | 2/2006 | Schiemann | 701/102 |
| 7,235,034 B2 * | 6/2007 | Berglund et al. | 477/107 |
| 7,278,383 B2 * | 10/2007 | Kamiyama et al. | 123/48 C |
| 7,308,873 B2 * | 12/2007 | Arai et al. | 123/90.16 |
| 7,487,748 B2 * | 2/2009 | Zajac | 123/70 R |
| 7,530,343 B2 * | 5/2009 | Megli et al. | 123/322 |
| 8,401,721 B2 * | 3/2013 | Nakamura et al. | 701/22 |
| 2008/0051979 A1 * | 2/2008 | Yasui et al. | 701/105 |
| 2009/0125208 A1 * | 5/2009 | Yasui | 701/103 |
| 2011/0172898 A1 * | 7/2011 | Eiraku et al. | 701/103 |
| 2012/0197550 A1 * | 8/2012 | Cianflone et al. | 702/45 |
| 2013/0255630 A1 * | 10/2013 | Aso et al. | 123/445 |
| 2013/0276443 A1 * | 10/2013 | Andrasko et al. | 60/602 |

FOREIGN PATENT DOCUMENTS

| | | |
|---|---|---|
| JP | 2003-328792 | 11/2003 |
| JP | 2004-76677 | 3/2004 |
| JP | 2006-312943 | 11/2006 |
| JP | 2007-321707 | 12/2007 |

* cited by examiner

INTAKE AIR CONTROL APPARATUS FOR VEHICULAR INTERNAL COMBUSTION ENGINE

CROSS-REFERENCE TO RELATED APPLICATIONS

This application claims priority to Japanese Patent Application No. 2008-057272 filed Mar. 7, 2008, which is incorporated by reference herein in its entirety.

BACKGROUND OF THE INVENTION

1. Field of the Invention

The present invention relates to an intake air control apparatus for a vehicular internal combustion engine in which a quantity of intake air provided to the engine is controlled using a variable control mechanism configured to control a valve opening characteristic of one or more intake valves, the valve opening characteristic including a combination of the valve lift and the valve opening phase angle. More particularly, the present invention relates to intake air quantity control of the internal combustion engine in a transient period between a low-load operating condition and a reacceleration operating condition of the engine and vehicle.

2. Description of the Related Art

In an internal combustion engine, generally an intake air quantity is controlled by adjusting an opening angle of a throttle valve installed within an intake air passage. As is well known in the art, this type of intake air flow quantity control can result in a large pumping loss at low and moderate engine operating loads when the opening angle of the throttle valve is particularly small. Attempts have been made in the prior art to control the intake air quantity independently of the throttle valve by varying the valve lift (i.e., the distance or amount of travel of the valve when fully opened) and/or the valve phase angle (i.e., the timing of opening and closing the valve relative to top dead center of the piston) of the intake valve.

Japanese Patent Provisional Publication No. 2002-256905 discloses an apparatus which includes a first variable valve operating mechanism for varying a valve lift (i.e., the distance or amount of travel) of an intake valve of an engine and a second variable valve operating mechanism for continuously varying a valve phase angle (i.e., the timing of opening and closing) of the intake valve. The apparatus is adapted to control an intake air quantity in the engine by controlling a valve opening characteristic of the intake valve which is determined based on the valve lift and the valve phase angle.

Japanese Patent Provisional Publication No. 2006-312943 discloses determining a limit value of a valve phase angle which may cause physical interference between the piston and the intake valve, for instance, by detecting an actual valve lift and by controlling a target value of the valve phase angle so as not to advance the valve phase angle beyond the limit value for the purpose of providing a large control region over which the valve lift and the valve phase angle can be controlled without causing the intake valve to contact the piston.

SUMMARY OF THE INVENTION

In one embodiment of the invention, an intake air control apparatus is provided for controlling an intake valve which regulates intake air to a vehicular internal combustion engine. The intake air control apparatus includes a variable valve operating mechanism configured to vary a valve lift of the intake valve and to vary a valve phase angle of the intake valve, and a controller for controlling the variable valve operating mechanism. The controller calculates a first target value corresponding to a combination of the valve lift and the valve phase angle which is desired at a current engine operating condition. When an accelerator is in a fully closed position, the controller calculates a reacceleration estimated value corresponding to a combination of the valve lift and the valve phase angle based on an engine rotational speed and an engine operating load estimated to occur upon reacceleration. Further, the controller determines whether or not a minimum clearance between the intake valve and a piston would become less than a permissible value during variation of the valve lift and the valve phase angle from the first target value toward the reacceleration estimated value, and calculates a second target value corresponding to a combination of the valve lift and the valve phase angle at which the engine torque produced is equivalent to the torque produced at the first target value and at which the minimum clearance remains greater than or equal to the permissible value during variation of the valve lift and the valve phase angle from the second target value toward the reacceleration estimated value. In addition, the controller sets the first target value as a control target value, and then switches the control target value from the first target value to the second target value when it is determined that the minimum clearance would become less than the permissible value during variation of the valve lift and the valve phase angle from the first target value toward the reacceleration estimated value.

In another embodiment of the invention, an intake air control apparatus is provided for controlling an intake valve which regulates intake air to a vehicular internal combustion engine. The intake air control apparatus includes a variable valve lift mechanism configured to vary a valve lift of the intake valve and a variable valve phase angle mechanism configured to vary a valve phase angle of the intake valve, and a controller for controlling an intake air quantity provided to the engine in accordance with the valve lift and the valve phase angle of the intake valve as varied by the variable valve lift mechanism and the variable valve phase angle mechanism, respectively. The controller sets as a control target value a first target value corresponding to a combination of the valve lift and the valve phase angle based on a current engine operating condition. When an accelerator is in a fully closed position, the controller calculates a reacceleration estimated value corresponding to a combination of the valve lift and the valve phase angle based on an engine rotational speed and an engine operating load estimated to occur upon reacceleration. Further, the controller determines whether or not a minimum clearance between the intake valve and a piston would become less than a permissible value during variation of the valve lift and the valve phase angle from the first target value toward the reacceleration estimated value. When it is determined that the minimum clearance would become less than the permissible value during variation of the valve lift and the valve phase angle from the first target value toward the reacceleration estimated value, the controller sets as the control target value a second target value corresponding to a combination of the valve lift and the valve phase angle at which the engine torque produced is equivalent to the engine torque produced at the first target value and at which the minimum clearance remains greater than or equal to the permissible value during variation of the valve lift and the valve phase angle from the second target value to the reacceleration estimated value.

In another embodiment of the invention, a method is provided for controlling an intake valve which regulates intake air to an a vehicular internal combustion engine, the engine having a variable valve operating mechanism configured to vary a valve lift of the intake valve and to vary a phase angle of the intake valve. The method includes calculating a first target value corresponding to a valve lift and a valve phase angle which are desired in a current engine operating condition. The method further includes, when an accelerator is in a fully closed position, calculating an estimated reacceleration value corresponding to a valve lift and a valve phase angle based on an estimated load upon reacceleration and an engine rotational speed. The method additionally includes determining whether or not a minimum clearance between the intake valve and a piston would become less than a permissible value during variation of the valve lift and the valve phase angle from the first target value toward the reacceleration estimated value, calculating a second target value corresponding to a combination of the valve lift and the valve phase angle at which the engine torque is equivalent to the engine torque produced at the first target value and at which the minimum clearance remains greater than or equal to the permissible value during variation of the valve lift and the valve phase angle from the second target value toward the reacceleration estimated value, setting the first target value as a control target value, and then switching the control target value from the first target value to the second target value when it is determined that the minimum clearance would become less than the permissible value during variation of the valve lift and the valve phase angle from the first target value toward the reacceleration estimated value.

In another embodiment of the invention, an intake air control apparatus is provided for controlling an intake valve which regulates intake air to a vehicular internal combustion engine. The intake air control apparatus includes variable valve operating means for varying a valve lift and a valve phase angle of the intake valve, first target value calculating means for calculating a first target value corresponding to a combination of the valve lift and the valve phase angle which is desired at a current engine operating condition, reacceleration estimated value calculating means for calculating, when an accelerator is in a fully closed position, and a reacceleration estimated value corresponding to a combination of the valve lift and the valve phase angle based on an engine rotational speed and an engine operating load estimated to occur upon reacceleration. The apparatus further includes determining means for determining whether or not a minimum clearance between the intake valve and a piston would become less than a permissible value during variation of the valve lift and the valve phase angle from the first target value toward the reacceleration estimated value, second target value calculating means for calculating a second target value corresponding to a combination of the valve lift and the valve phase angle at which the engine torque produced is equivalent to the torque produced at the first target value and at which the minimum clearance remains greater than or equal to the permissible value during variation of the valve lift and the valve phase angle from the second target value toward the reacceleration estimated value, and setting means for setting the first target value as a control target value and then switching the control target value from the first target value to the second target value when it the determining means determines that the minimum clearance would become less than the permissible value during variation of the valve lift and the valve phase angle from the first target value toward the reacceleration estimated value.

Accordingly, the invention enables improved reacceleration performance of the engine and the vehicle while avoiding a situation in which interference could occur between the intake valve and the piston.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

Figure 1:
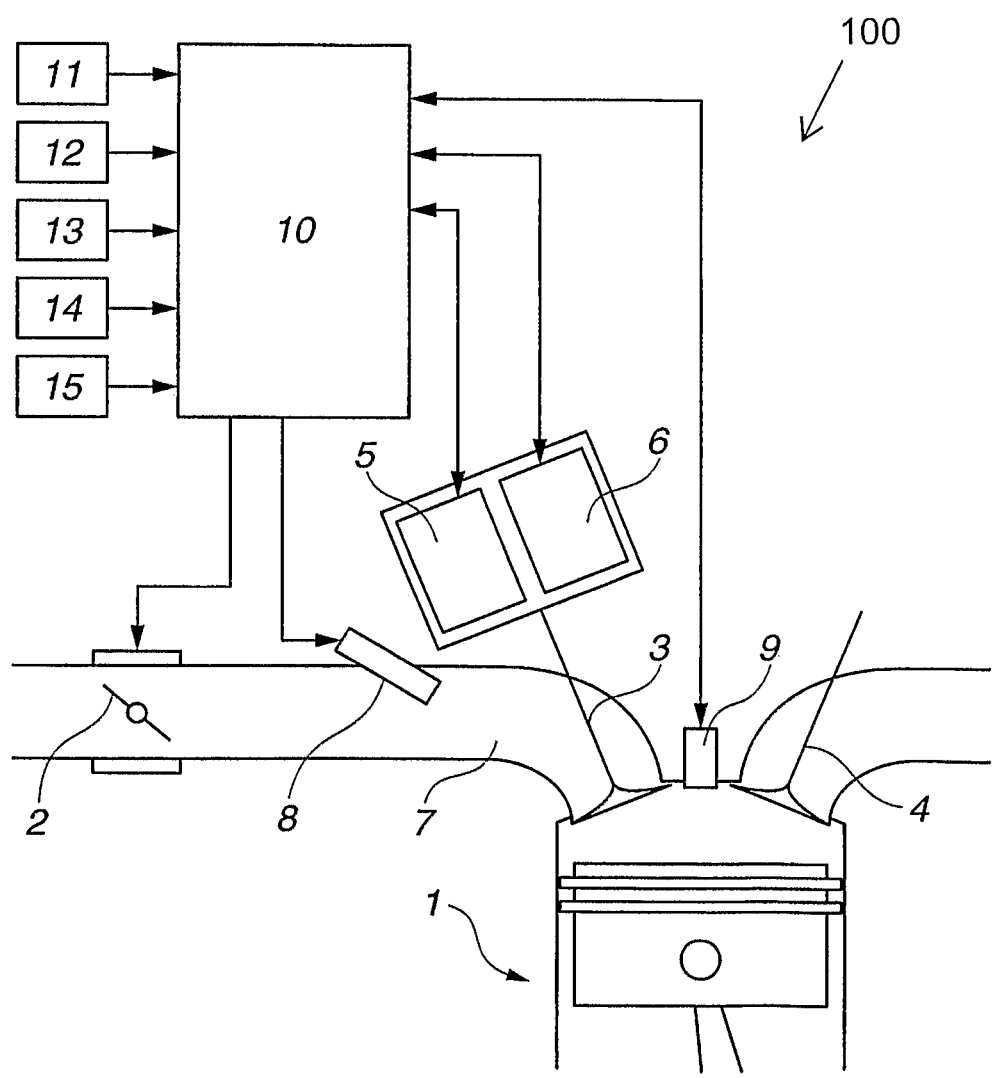
FIG. 1 is an exemplary diagram illustrating an intake air control apparatus for an internal combustion engine according to an embodiment of the present invention.

Embodiments of the present invention will be described in detail below with reference to the accompanying drawings.

In the present invention, when a driver operates the vehicle such that the engine is in a low-load operating condition, for example by moving the accelerator to a fully closed position such as during deceleration or coasting, the intake valve lift is generally small and the intake valve phase angle is generally in a relatively advanced position. When the driver then operates the vehicle such that the engine is in a reacceleration operating condition, for example by stepping on the accelerator to rapidly reaccelerate the vehicle, it is desired to move the intake valve lift to a large lift amount and the intake valve phase angle to a relatively retarded position.

As used herein, a small lift means that the valve opens by a small amount to admit a relatively small amount of intake air, and a large lift means that the valve opens by a large amount to admit a relatively large amount of intake air. In addition, because the valve opening duration, or the amount of time (measured in crank angles) that a valve is open, may correspond directly to the valve lift, a small valve lift may indicate that the valve opens for a relatively short amount of time and a large valve lift may indicate that the valve opens for a relatively long amount of time.

Thus, a transient operating condition occurs during a transient period between the low-load operating condition and the reacceleration operating condition during which the valve lift is moved from a small lift amount to a large lift amount and the valve phase angle is moved from an advanced position to a retarded position. During the transient operating condition, a target value of the valve lift varies in an increasing direction and a target value of the valve phase angle varies in a retarding direction. The target value of the valve lift and the target value of the valve phase angle are varied in a stepwise fashion based on a control target value set by a controller, as described below.

In an engine having an intake air control apparatus including two variable valve operating mechanisms, a variable valve lift mechanism and a variable valve phase angle mechanism, optimal target values of the respective variable valve operating mechanisms are determined in accordance with an engine driving condition, and the respective variable valve operating mechanisms are controlled on the basis of the optimal target values. There exists an infinite number of combinations of the valve lift and the valve phase angle which produce a necessary torque in accordance with a current engine driving condition. For example, if the best fuel economy is desired, optimal target values of the valve lift of the intake valve and the valve phase angle of the intake valve are determined using engine load (or accelerator opening) and engine rotational speed as parameters.

When the driving condition is abruptly changed from one driving condition to another, the respective target values of the valve lift and the valve phase angle are varied stepwise and the variable valve operating mechanisms are separately and independently operated in accordance with the variation of the respective target values. Accordingly, during the transient period while the valve lift and valve phase angle are being varied, it is possible that a minimum clearance between the intake valve and a piston in the vicinity of a top dead center becomes excessively small to thereby cause physical interference between the piston and the intake valve. The problem of interference can occur even when both a present target value corresponding to a combination of the present valve lift and the present valve phase angle (that is, immediately before the transient period due to a change of the driving condition), and a target value corresponding to a target combination of the valve lift and the valve phase angle after the transient period due to the change of the driving condition, are set so as to prevent interference between the piston and the intake valve, because the variable valve operating mechanisms are operated to independently vary the valve lift and the valve phase angle during the transient period such that one of the valve lift and the valve phase angle may change more rapidly than the other. Therefore, there is a possibility that a combination of an actual valve lift and an actual valve phase angle temporarily causes an excessive decrease in the minimum clearance so as to undesirably cause physical interference between the piston and the intake valve.

FIG. 1 is an explanatory diagram illustrating an intake air control apparatus 100 for an internal combustion engine 1 according to an embodiment of the present invention. As shown in FIG. 1, the internal combustion engine 1 includes an intake valve 3, an exhaust valve 4, a variable valve lift mechanism (VEL) 5 to adjust the valve lift of the intake valve 3, and a variable valve phase angle mechanism (VTC) 6 to adjust the timing or phase angle of the intake valve 3. The variable valve lift mechanism 5 is configured to vary the lift amount and the opening duration of the intake valve 3. The variable phase angle mechanism 6 is configured to vary the central angle or phase angle of the opening of the intake valve 3. Collectively, the variable valve lift mechanism 5 and the variable phase angle mechanism 6 can be referred to as a variable valve operating mechanism.

Air is provide to the intake valve 3 via an intake passage 7 having a vacuum control valve 2 (or an electronically controlled throttle valve). The opening of the vacuum control valve 2 is controlled by an actuator such as a motor. The vacuum control valve 2 is used only for the purpose of generating a slight vacuum (for example, −50 mmHg) necessary for controlling a blow-by gas flow within intake passage 7. Accordingly, regulation of the quantity of intake air provide to the engine 1 is performed by varying valve opening characteristics of the intake valve 3 by way of the variable valve lift mechanism 5 and the variable phase angle mechanism 6.

Therefore, in a low-load operating condition when the only a small amount of fuel is supplied to the internal combustion engine 1, regulation of the intake air quantity is performed without depending on a variation in throttle opening by instead controlling the intake valve opening characteristics. The variable valve lift mechanism 5 and the variable phase angle mechanism 6, as well as the vacuum control valve 2, are controlled by a controller 10.

A fuel injection valve 8 is disposed in intake passage 7 and is operative to inject an amount of fuel corresponding to the intake air quantity that is regulated by the intake valve 3, as described above. Accordingly, the power output of internal combustion engine 1 is controlled by regulating the intake air quantity by way of the variable valve lift mechanism 5 and the variable phase angle mechanism 6.

The controller 10 receives an accelerator opening signal (APO) from an accelerator opening sensor 11 disposed on an accelerator pedal that is operated by a vehicle driver, an engine revolution speed signal (Ne) from an engine rotational speed sensor 12, and an intake air quantity signal from an intake air quantity sensor 13. Based on these signals, the controller 10 calculates a fuel injection amount, an ignition timing, a target opening of the vacuum control valve 2, a valve lift of the intake valve 3 (i.e., target angle of the variable valve lift mechanism 5), and a target phase angle of the intake valve 3 (i.e., a target angle of the variable phase angle mechanism 6). Further, the controller 10 controls the fuel injection valve 8 and an ignition plug 9 to achieve the fuel injection amount and ignition timing. The controller 10 also outputs control signals for controlling the vacuum control valve 2, the variable valve lift mechanism 5, the variable phase angle mechanism 6. The variable valve lift mechanism 5 and the variable phase angle mechanism 6 can have a generally known mechanical constructions as described, for example, in Japanese Patent Provisional Publication No. 2002-256905. Therefore, a detailed explanation for the mechanical construction of the variable valve lift mechanism 5 and the variable phase angle mechanism 6 is omitted. The variable valve lift mechanism 5 and the variable phase angle mechanism 6 each include sensors to sense an actual valve lift and a phase angle of the intake valve 3, respectively.

Further, the intake air control apparatus 100 includes a vehicle speed sensor 14 that detects vehicle speed (VSP), and a brake sensor 15 that detects an amount of depression of a brake that is operated by the vehicle driver. Upon a deceleration of the vehicle in which accelerator is in a fully closed position (APO=0), a fuel cutoff (i.e., a stoppage of fuel supply) may be performed in order to improve fuel mileage. Typically, a fuel cutoff is performed when certain requirements are fulfilled, such as the vehicle speed (VSP) is not less than a predetermined value and the engine rotational speed (Ne) is not less than a predetermined value, and after a warm-up of the engine has been completed.

Figure 2:
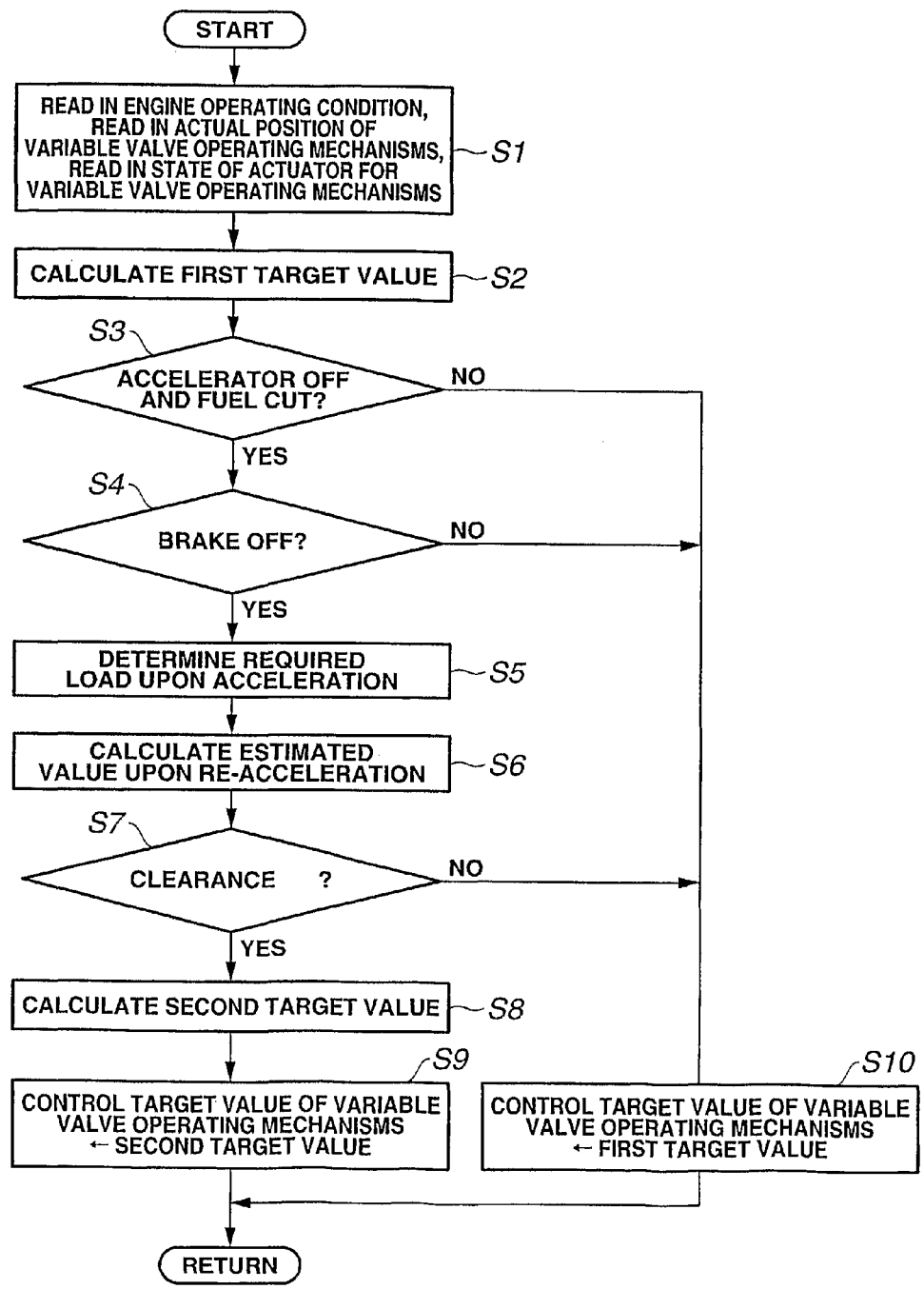
FIG. 2 is a flow chart illustrating a control process of the intake air apparatus according to an embodiment of the present invention.

FIG. 2 is a control sequence flow chart depicting an intake air control process that is carried out upon deceleration, according to the present invention. The control process is repeatedly executed while the engine 1 is operating.

In step S1, signal values indicating the current operating condition of the engine 1 are detected by the controller 10, including the accelerator opening (APO), the engine rotational speed (Ne), the actual value of the intake valve lift, and the actual value of the intake valve phase angle, as well as states of parameters related to the variable valve lift mechanism 5 and the variable phase angle mechanism 6 (such as a hydraulic pressure and a temperature of the engine, which may influence the response speed of the mechanisms 5 and 6). These values are read into the controller 10.

In step S2, a first target value is calculated by the controller 10. The first target value corresponding to a combination of an optimal value of the valve lift and an optimal value of the valve phase angle to achieve a desired result at the present operating condition. For example, the first target value may be the optimal value for achieving fuel economy at the present engine operating condition. The first target value is obtained, for example, from a predetermined control map based on the engine load that is determined using the accelerator opening (APO), and engine rotational speed (Ne) as parameters.

In step S3, the controller 10 determines whether or not accelerator is off or in the fully closed position and a fuel cutoff has been carried out (APO=0). When the accelerator is off and a fuel cutoff has been carried out (i.e., the determination in step S3 is YES), the process proceeds to step S4. When the determination in step S3 is NO, the process proceeds to step S10.

In step S10, the first target value calculated in step S2 is used to set control target values of the variable valve lift mechanism 5 and the variable phase angle mechanism 6. Accordingly, during an operating condition in which the accelerator is not in the fully closed position (APO≠0), or when the accelerator is in the fully closed position (APO=0) but a fuel cutoff has been not been carried out (including a state in which fuel recovery has occurred subsequent to a fuel cutoff), the valve lift and the valve phase angle are controlled according to the first target value.

In step S4, when the accelerator is in the fully closed position and the fuel cutoff has been carried out, the controller 10 determines whether or not the brake operation is in an off condition (i.e., the brake pedal is not depressed). When the determination in step S4 is NO, indicating that the brake pedal is depressed, the vehicle driver intends to slow the vehicle and is not expected to immediately reaccelerate. Therefore, the process proceeds to step S10 in which the valve lift and the valve phase angle are controlled according to the first target value.

When the brake operation is in the off condition (i.e., when the brake pedal is not depressed), the process proceeds to step S5. In step S5, the controller 10 determines an estimated required load upon reacceleration. For instance, the required load corresponding to the present engine rotational speed (Ne) is estimated assuming that accelerator opening is rapidly increased to a certain amount upon reacceleration. For example, the required load can be estimated based on an accelerator opening value (APO) of 50%, 75%, or 100%. That is, a hypothetical accelerator opening value is set and a hypothetical required load is determined in accordance with the hypothetical accelerator opening value. Alternatively, the load required upon reacceleration may be estimated on the basis of the present vehicle speed (i.e., a "road load" accounting for factors such as tire and air resistance and the like).

In step S6, the controller 10 calculates a reacceleration estimated value for a combination of the valve lift and the valve phase angle which is optimum with respect to the required load as estimated in step S5 and the present engine rotational speed (Ne). That is, the valve lift and the valve phase angle can be estimated upon reacceleration using the same control map as that for obtaining the first target value. Note that when reacceleration is actually carried out, the valve operating characteristics typically do not attain a valve lift and a valve phase angle corresponding exactly to the reacceleration estimated value because control of the valve lift and the valve phase angle is conducted according to a control target value based on the current engine operating condition such as an actual accelerator opening and an actual engine rotational speed and the like; rather the reacceleration estimated value is used to predict and avoid a situation in which the clearance between the intake valve 3 and the piston would become less than a permissible value. Therefore, the predictive calculation of the reacceleration estimated value can be conducted without necessitating precise accuracy.

Next, in step S7, the controller 10 determines, based on the first target value and the reacceleration estimated value, whether or not the minimum clearance between the piston and the intake valve in the vicinity of top dead center would less than a permissible value when a control target value is varied stepwise from the first target value to the reacceleration estimated value. The first target value substantially corresponds to the present valve lift and the present valve phase angle of the intake valve 3. Alternatively, an actual valve lift and an actual valve phase angle of the intake valve 3 can be detected by various kinds of sensors and used by the controller 10.

The determination in step S7 is made in view of the respective response speeds of variable valve lift mechanism 5 and variable phase angle mechanism 6. Usually, the variable valve lift mechanism 5 and the variable phase angle mechanism 6 are mechanically operated and have response speeds that are different from each other. In other words, in general, the time required for the valve lift to vary from a present value to a target value and the time required for the valve phase angle to vary from a present value to a target value are different from each other. Further, in a case where a response speed of variation (e.g., increase) of the valve lift is faster than a response speed of variation (e.g., retarding) of the valve phase angle, such that the valve lift reaches a valve lift target value earlier than the valve phase angle reaches a phase angle target value, the valve lift is undesirably increased before the valve phase angle is sufficiently retarded. This results in temporarily reducing the minimum physical clearance between the piston and the intake valve in the vicinity of the top dead center.

Accordingly, in an extreme case, physical interference between the piston and the intake valve may occur. The prior art does not provide a means for avoiding such interference, which can be extremely destructive to the engine. In contrast, the present invention provides a means to avoid a temporary reduction to an undesirable amount of the clearance between the piston and the intake valve which results from the difference between the respective response speeds of the variable valve lift mechanism 5 and the variable phase angle mechanism 6.

Further, under the circumstances described above, if the response speed of the variable valve lift mechanism 5 is restricted to a region in which the interference between the piston and the intake valve does not occur, and no other accommodation is made in the intake valve operating characteristics, the interference can be avoided but the engine torque response upon reacceleration becomes slow, thereby deteriorating the acceleration characteristics of the engine and vehicle. The present invention solves the problem of interference while maintaining a desirable acceleration performance of the engine and vehicle.

Figure 4:
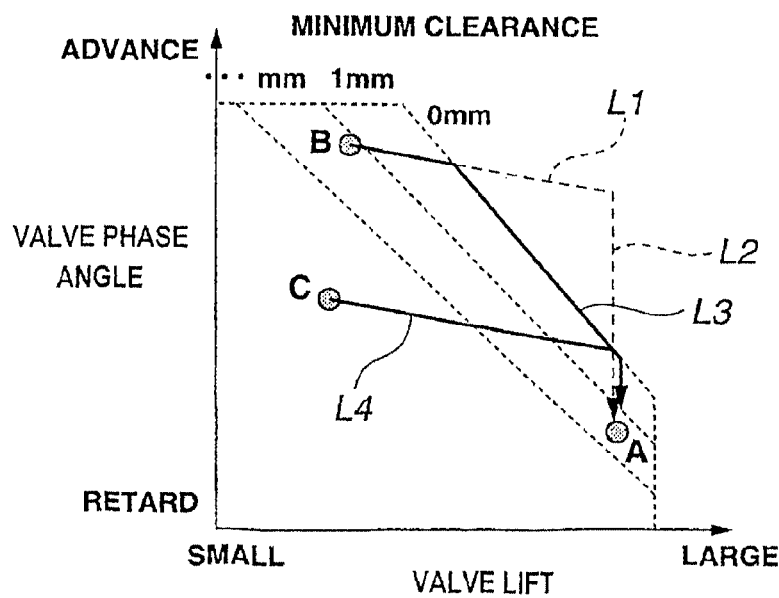
FIG. 4 is a diagram illustrating a relationship between intake valve lift, intake valve phase angle, and a minimum clearance between the piston and the intake valve.

FIG. 4 is a characteristic diagram illustrating a relationship between the valve lift and the valve phase angle, and the minimum clearance between the piston and the intake valve 3 when the valve 3 is at or near maximum lift and the piston is at or near top dead center. The minimum clearance between the intake valve and the piston decreases along with an increase in the valve lift and with an advance of the valve phase angle toward the top dead center. As shown, in FIG. 4, values of the minimum clearance can be drawn in the form of contour lines with respect to the valve lift and the valve phase angle as parameters, such that the minimum clearance becomes smaller toward the upper-right portion of the graph where the valve lift is large and/or the phase angle is advanced. A minimum permissible clearance value is typically set to be an incremental value α larger than zero.

In FIG. 4, point B represents a present value of the valve lift and a present value of the valve phase angle (i.e., values of the valve lift and the phase angle corresponding to the first target value) and point A represents a reacceleration target value of the valve lift and a reacceleration target value of the valve phase angle (i.e., values of the valve lift and the phase angle corresponding to the reacceleration estimated value). Although the minimum clearance at point A and point B are greater than zero (or more than an incremental value α larger than zero), meaning that the intake valve 3 will not contact the piston at these combinations of valve lift and phase angle, of concern is what occurs during the transient operating condition as the variable valve lift mechanism 5 and the variable phase angle mechanism 6 independently vary the valve lift and the phase angle, respectively, in moving from the first target value to the reacceleration estimated value.

If the variable valve lift mechanism 5 and the variable phase angle mechanism 6 could be synchronized so that valve lift and the valve phase angle are varied at the same rate, the synchronous variation of the valve lift and the valve phase angle could be linearly drawn so as to extend directly from point B to point A. However, in actuality, the response speeds of the valve lift and the valve phase angle do not always synchronize with each other, and are dependent on the state of actuators comprised in the variable valve lift mechanism 5 and the variable phase angle mechanism 6, as well as surrounding environmental conditions such as ambient temperature. As a result, in some circumstances, the minimum clearance might become less than the permissible minimum clearance value and thereby cause interference between the piston and the intake valve. A purpose of the present invention is to avoid such interference.

Figure 7:
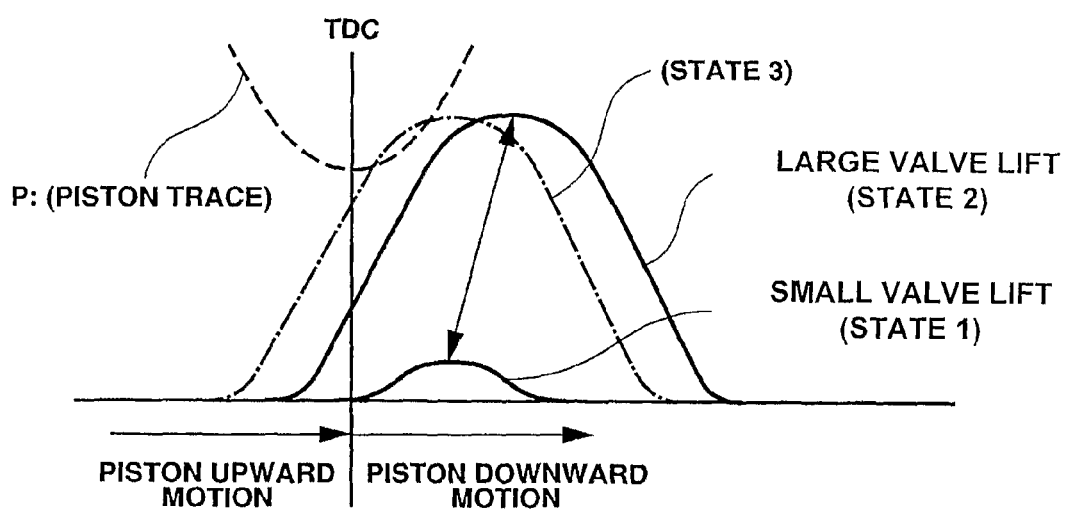
FIG. 7 is a diagram illustrating interference and clearance between a piston and an intake valve.

FIG. 7 is a diagram illustrating situations of interference and clearance between the piston and the intake valve 3. In FIG. 7, a dashed line schematically depicts a trace of the piston and shows a most upward position of the piston in the vicinity of top dead center (TDC). Solid lines depict a lift curve of the intake valve at a small valve lift (state 1) and a lift curve of the intake valve at a large valve lift (state 2). Usually, when the operation of the intake valve is shifted from a state such as state 1 at a small valve lift to a state such as state 2 at a large valve lift, the valve lift is increased while the valve phase angle of the valve opening is retarded. As long as the phase angle is retarded sufficiently before the valve lift reaches its maximum value at state 2, clearance will remain between the piston and the intake valve 3 in each transient position between state 1 and state 2. However, if the valve phase angle is changed more slowly than the valve lift when moving from state 1 to state 2, then the valve lift may be increased to a point where interference between the intake valve and the piston may occur before the valve phase angle can be sufficiently retarded. In this case, the intake valve might have a lift curve (state 3) at which interference between the intake valve and the piston is caused, as indicated by an alternate long and short dash line in FIG. 7.

As described above, if the rate of change of the valve phase angle is relatively low as compared with the rate of change of the valve lift, the valve phase angle will not be fully retarded to the reacceleration target phase angle value by the time the valve lift has been increased to the reacceleration target valve lift value, so that during the transient period between the valve operating characteristics being determined by the first target value and the valve operating characteristics being determined by the reacceleration target value, a condition may occur in which there could be interference between the intake valve and the piston. For example, the trace of variation in the valve lift and variation in the valve phase angle is indicated by broken lines L1 and L2, respectively, in FIG. 4. Accordingly, during the transient period, the minimum clearance becomes temporarily lower than 0, indicating interference. Thus, when the crank angle of the piston reaches intake top dead center during the transient period, interference between the piston and the intake valve occurs.

In order to avoid such possible interference between the piston and the intake valve, the apparatus of the above embodiment can function to limit the response speed of variable valve lift mechanism 5 to a low value so that the variable phase angle mechanism 6 has sufficient time to retard the phase angle to prevent the minimum clearance from falling into the upper-right region in FIG. 4 in which the minimum clearance becomes smaller than 0. The response speed of the variable valve lift mechanism 5 is limited in accordance with the actual valve lift and the actual valve phase angle which can be detected by valve lift and valve phase angle sensors incorporated into the variable valve lift and variable phase angle mechanisms 5, 6. Accordingly, the controller 10 avoids the situation in which the valve lift and the valve phase angle vary as indicated by broken lines L1, L2 by causing the valve lift and the valve phase angle to instead vary along solid line L3 that shows the minimum clearance of 0. (Actually, the variation of valve lift and valve phase angle passes slightly to the lower-left of the solid line L3 by an incremental clearance value α.) However, in step S7, the controller 10 determines only whether or not the minimum clearance having the characteristic as shown in broken lines L1, L2 is less than the permissible value (i.e., a value slightly larger than 0 mm by an incremental value α), without considering the limitation to the response speed of variable valve lift mechanism 5.

The trace of the transient variation from point B to point A as indicated by broken lines L1, L2 can be definitely determined if these two points A and B are fixed. Therefore, if the present first target value (point B) and the reacceleration estimated value at the present time (point A) are determined, it is possible to determine whether or not the minimum clearance is less than a permissible value (for instance, 0 mm+α). Further, because the response speeds of the variable valve lift mechanism 5 and the variable phase angle mechanism 6 are influenced by the hydraulic pressure available to drive the hydraulic actuator (of the variable valve mechanism 5) and the temperature of the electric motor actuator (of the variable phase angle mechanism 6), it is possible to make a correction to the determination as to whether or not the minimum clearance is less than a permissible value, on the basis of the states of these actuators. That is, for instance, it is possible to correct the incremental clearance value α.

FIG. 4 shows a case in which the response speed of the valve phase angle is relatively low as compared with the valve lift. In actuality, the retarding variation in the valve phase angle is typically delayed as compared with the increasing variation in the valve lift in almost all of cases where reacceleration is started from the fully closed state of the accelerator. As a result, the valve lift and the valve phase angle show the characteristic curves as indicated by broken lines L1, L2 in FIG. 4. Also, note that in a case in which the increasing variation in the valve lift is relatively delayed as compared with the retarding of the phase angle, the minimum clearance between the piston and the intake valve becomes larger, and therefore, no interference problem occurs.

In step S7, when it is determined that the minimum clearance is not less than the permissible value, the process proceeds to step S10 in which the valve lift and the valve phase angle are controlled according to the first target value and the reacceleration target value. Specifically, in this case, a normal control is conducted according to the first target value even during deceleration that is accompanied by a fuel cutoff. If reacceleration is subsequently conducted, variation in the valve lift and the valve phase angle is started from the valve lift and the valve phase angle corresponding to the first target value at the time of reacceleration.

On the other hand, in step S7, when it is determined that the minimum clearance is less than the permissible value, the process proceeds to step S8 in which a second target value is calculated. The second target value, corresponding to a combination of the valve lift and the valve phase angle, is substituted for the first target value before beginning the transient period in which the valve operating characteristics are varied to correspond to the reacceleration target value. The second target value is a value, corresponding to a combination of the valve lift and the valve phase angle, at which the engine torque produced is equivalent to the engine torque produced at the first target value. In addition, the second target value is a value at which at which the minimum clearance between the piston and the intake valve in the vicinity of the top dead center does not becomes less than the permissible value during the transient period while the control target value is varied stepwise from the second target value to the reacceleration estimated value.

Figure 3:
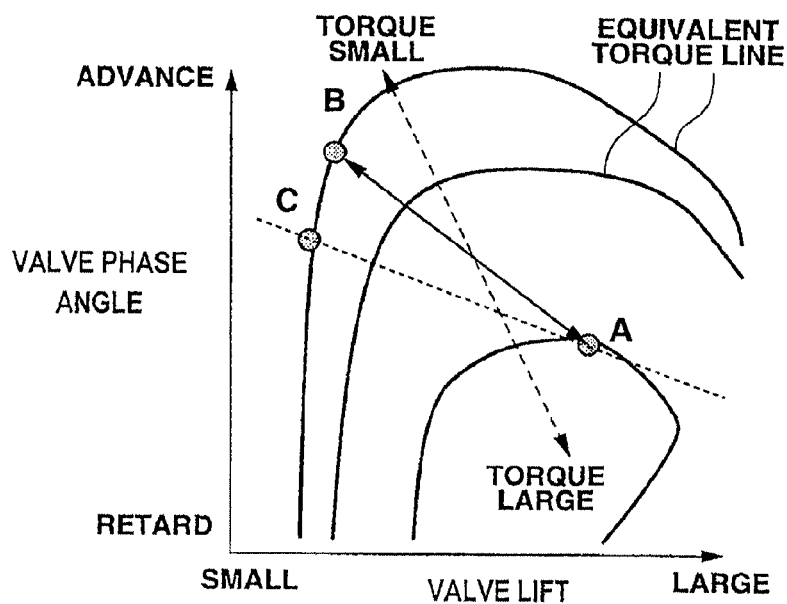
FIG. 3 is a diagram illustrating a relationship between intake valve lift, intake valve phase angle, and engine torque.

FIG. 3 is a diagram showing a characteristic curve of generated torque of the engine which is drawn in the form of contour lines with respect to the valve lift and the valve phase angle as parameters. In FIG. 3, point B (the first target value) is determined as a point indicating a combination of the valve lift and the valve phase angle at which the best fuel economy is attained among an infinite number of points on an equivalent torque line that indicates a torque equivalent to the torque produced at the first target value. At points along the equivalent torque line in the retarding direction of the valve phase angle with respect to point B, the combination of the valve lift and the valve phase angle results in a minimum clearance that is larger than the minimum clearance at point B, unless the valve lift is increased by an amount offsetting the gain in clearance due to the retarding of the valve phase angle.

In step S8, the second target value is determined by successively moving along the equivalent torque line, starting at a point closest to point B, and determining at each point of equivalent torque whether or not the minimum clearance is less than the permissible value (i.e., the evaluation of step S7). Accordingly, the second target value is determined to be a point corresponding to a combination of the valve lift and the valve phase angle at which the minimum clearance is not less than the permissible value. That is, the thus-determined second target value (for example, point C in FIG. 3) is obtained as a point closest to the first target value (point B), at which a minimum clearance is attained between the intake valve and the piston that is not less than the permissible value.

In addition, in order to simplify the process in step S8, the second target value can be determined by selecting a point as a combination of the valve lift and the valve phase angle at which the valve phase angle is retarded with respect to the valve phase angle at point B, for instance, a point that is located offset from point B by a predetermined angle, from a plurality of points each corresponding to the combination of the valve lift and the valve phase angle which produces an equivalent torque.

Then, the process proceeds to step S9 in which the second target value determined in step S8 is set as the control target value corresponding to the respective control target values of the valve lift and the valve phase angle. Accordingly, in step S9, the valve lift and the valve phase angle vary toward point C shown in FIG. 3 so as to be ready for reacceleration, regardless whether the reacceleration is ultimately carried out. However, since point C (the second target value) is a point at which the engine torque produced is equivalent to the engine torque produced at point B (the first target value), no substantial variation in torque occurs.

The control routine shown in FIG. 2 is repeatedly executed. Therefore, for example, when the vehicle driver depresses the accelerator pedal after step S9, the process proceeds from step S3 to step S10 in which the first target value is set corresponding to the respective control target values of the variable valve lift mechanism 5 and the variable phase angle mechanism 6. In a case where the accelerator pedal is not depressed and the brake is in the off condition, the fuel cutoff is released (fuel recovery) when the vehicle speed is decreased to a certain vehicle speed or the engine rotational speed is decreased to a certain rotational speed. In such a case, the first target value is set corresponding to the respective control target values of the variable valve lift mechanism 5 and the variable phase angle mechanism 6.

When the accelerator pedal is rapidly depressed by the vehicle driver and thereby reacceleration is carried out, the valve lift and the valve phase angle abruptly vary from point C as the second target value to a point near point A as the reacceleration estimated value. As shown in FIG. 4, point C (the second target value) is located in the retarded direction with respect to point B (the first target value). At point C, the minimum clearance between the piston and the intake valve is large. Therefore, when the valve lift and the valve phase angle vary from point C to point A with the valve lift varying more rapidly than the valve phase angle, as indicated by solid line L4 in FIG. 4, the minimum clearance is prevented from being decreased below the permissible value. Solid line L4 depicts the case where the actual transient variation reaches the limit of the minimum clearance so that the response speed of the variable valve lift mechanism 5 must be limited to a low value for a relatively brief time in order to avoid interference between the piston between the intake valve. Even when such a limitation in the response speed of the valve lift is carried out, the brief duration of the limitation in the response speed of the valve lift ensures that the transient response is considerably faster (i.e., the duration of the transient period is considerably shorter) than if the valve lift and the valve phase angle were to vary from point B (the first target value) to point A (the reacceleration estimated value). As a result, the engine torque can be increased more quickly and the response of the vehicle during reacceleration is enhanced.

Figure 6:
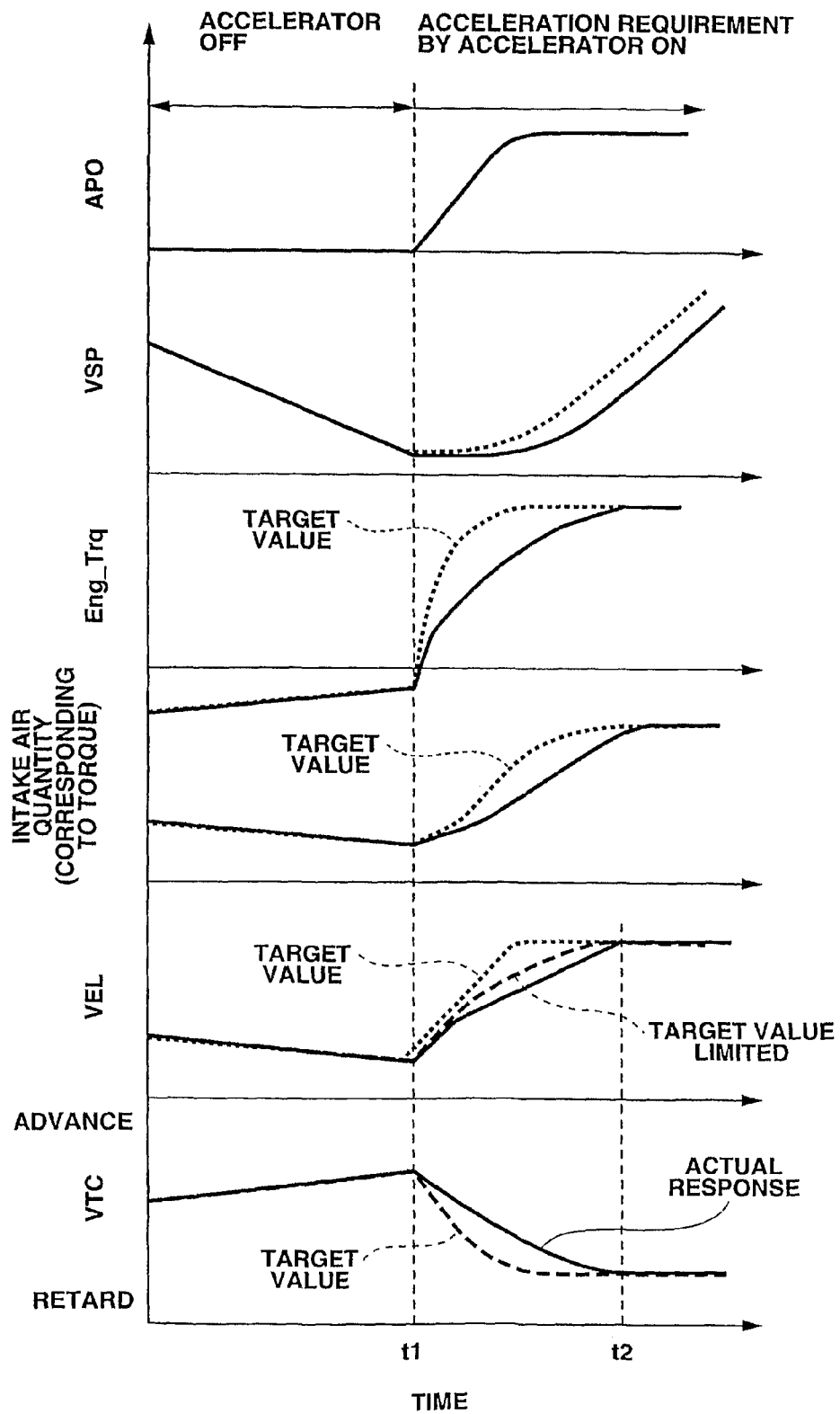
FIG. 6 is a timing chart illustrating an operation of an intake air control apparatus as a comparative example in which switching between target values is not carried out.

Next, an example of the operation of an intake air control apparatus upon shifting from a deceleration to a reacceleration is explained with reference to timing charts. First, referring to FIG. 6, a comparative example of an intake air control apparatus is shown in which shifting to the second target value is not carried out, but rather operation of the engine is continuously conducted while maintaining the first target value. As indicated by variation in acceleration opening (APO) shown in an upper-most part of the timing chart of FIG. 6, deceleration is carried out by moving the accelerator to the fully closed position during the vehicle running, so as to reduce vehicle speed (VSP). Reacceleration is conducted at time t1. FIG. 6 also plots engine torque (Eng_trq), valve lift (VEL), and valve phase angle (VTC).

In the comparative example of FIG. 6, a fuel cutoff is carried out during deceleration, and therefore, the intake air quantity that is determined by the valve lift and the valve phase angle has a positive value but the engine torque has a negative value, during deceleration. At the moment of time t1, the valve lift is small and the valve phase angle is relatively advanced with respect to top dead center. For instance, the valve operating characteristics at t1 correspond to point B shown in FIG. 4.

As the accelerator opening (APO) is rapidly increased when the vehicle driver demands reacceleration, the target value of the valve lift is rapidly increased as indicated by dotted line in FIG. 6, and the target value of the valve phase angle is rapidly retarded as indicated by broken line in FIG. 6. For instance, this corresponds to point A shown in FIG. 4. The actual valve lift and the actual valve phase angle are varied (i.e., controlled) so as to follow the target values thereof as indicated by solid line in FIG. 6. If the variation in the actual valve lift and the actual valve phase angle continues, interference between the piston and the intake valve may occur as described above. Therefore, in order to avoid interference, the target value of the valve lift is limited to a limited target value, as indicated by broken line in FIG. 6, so that the actual valve lift varies in accordance with the limited target value. As a result, a large delay occurs in the increase of the actual value of the intake air quantity as indicated by solid line in FIG. 6, as compared with the increase in a target value of the intake air quantity as indicated by dotted line in FIG. 6. Thus, the increase of the actual value (solid lines) both of the engine torque and the vehicle speed is delayed as compared to the increase of a target value (dotted lines). In other words, the time t2–t1 required for both the actual valve lift and the actual valve phase angle to converge to the respective target values after acceleration is prolonged and the acceleration response performance of the vehicle is deteriorated.

Figure 5:
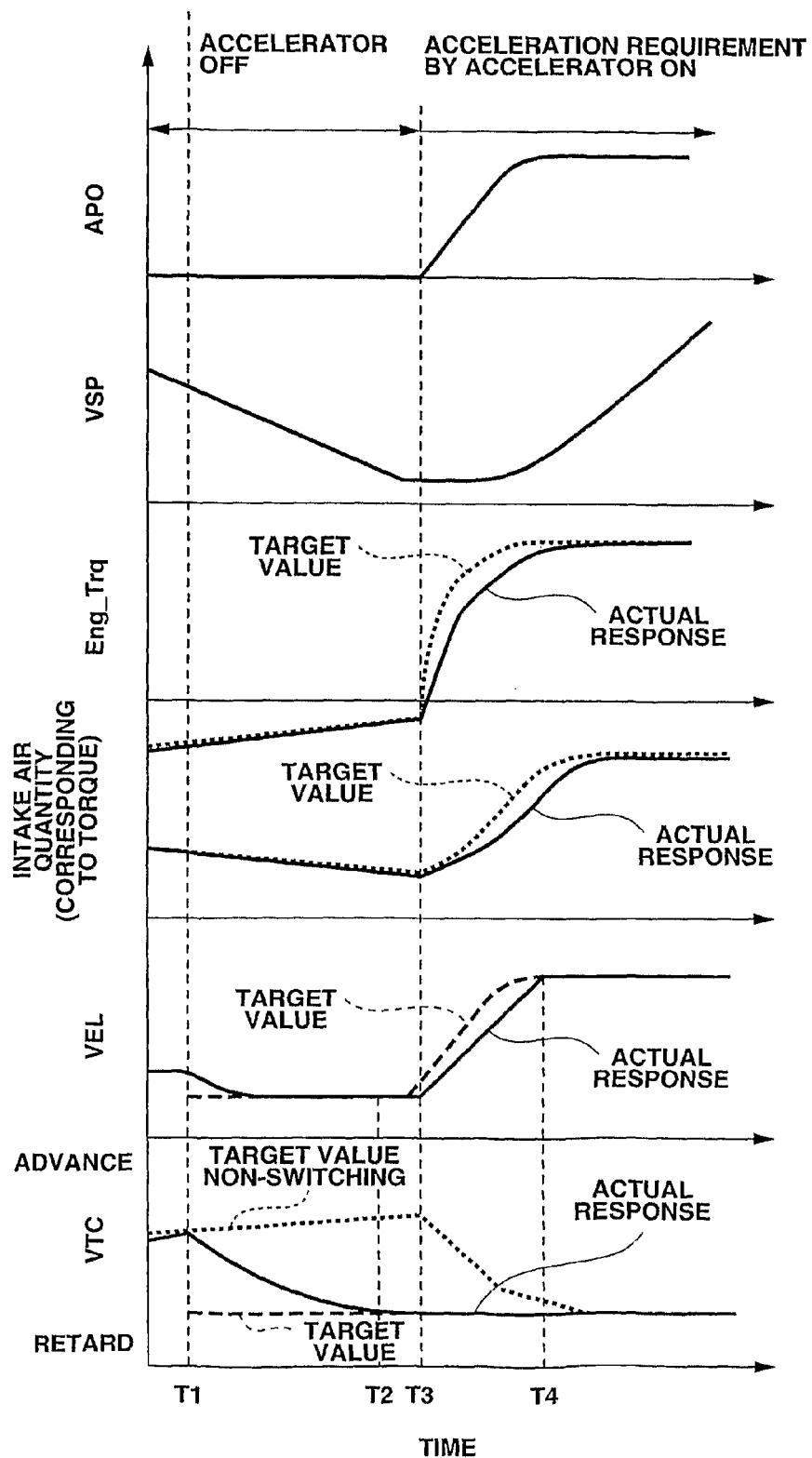
FIG. 5 is a timing chart illustrating an operation of the intake air control apparatus of an embodiment of the invention upon shifting from deceleration to re-acceleration.

FIG. 5 shows a behavior of the intake air control apparatus of the embodiment of the invention in accordance with the process shown in FIG. 2, which is repeatedly executed. At the moment of time T1 during a deceleration operation, it is determined that the minimum clearance based on the first target value and the reacceleration estimated value at time T1 is less than the permissible value. Thus, the control target values for the valve lift and the valve phase angle are switched to those based on a second target value as indicated by broken line in FIG. 5. The actual valve lift and the actual valve phase angle vary so as to follow the second target value. The valve phase angle based on the second target value is largely retarded with respect to the valve phase angle based on the first target value, and therefore, the actual valve phase angle reaches the valve phase angle based on the second target value, for instance, at time T2. Since the second target value corresponds to a point at which the engine torque produced is equivalent to the engine torque produced at the first target value, the intake air quantity and the engine torque are not substantially varied during a period from time T1 to time T2. Particularly, since the deceleration operation is accompanied with a fuel cutoff, the vehicle driver can be prevented from suffering an abnormal feeling with regard to the vehicle performance even when some variation occurs in the intake air quantity. For instance, the second target value corresponds to point C shown in FIG. 4.

Next, re-acceleration is carried out beginning at the moment of time T3, so that the valve lift and the valve phase angle that are based on the target value are changed, for example, toward point A shown in FIG. 4, as indicated by broken lines in FIG. 5. At this time, the valve lift based on the target value is largely increased, but the valve phase angle based on the target value undergoes substantially no change because the valve phase angle based on the target value is already retarded. Accordingly, both the actual valve lift and the actual valve phase angle converge to the respective values based on the target value at the moment of time T4, so that the required time T4–T3 for the transient period between the second target value and the reacceleration estimated value is short compared with the time t2–t1 in the comparative embodiment of FIG. 6. Therefore, the actual increase of the intake air quantity and the engine torque exhibits a response similar to that of the respective target values.

In the flow chart shown in FIG. 2, only when the minimum clearance is less than the permissible value, the second target value is calculated. However, as can be readily understood by a person skilled in the art, the control can be modified as follows. That is, when a predetermined condition is fulfilled during deceleration, both the first target value and the second target value are always calculated and one of the first and second target values is selected by determining whether or not the minimum clearance is not less than the permissible value.

In addition, although the intake air control apparatus of the above embodiment is applied to a variable valve operating mechanism that acts to increase and decrease the valve lift and the valve phase angle, the present invention is not limited to the above embodiment. The intake air control apparatus according to the present invention can be also applied to other variable valve operating mechanisms, for instance, variable valve operating mechanisms as described in Japanese Patent Provisional Publication No. 9-184406 and Japanese Patent Provisional Publication No. 9-268906, which act to vary only the valve lift.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. An intake air control apparatus for controlling an intake valve which regulates intake air to a vehicular internal combustion engine, the intake air control apparatus comprising:
   a variable valve operating mechanism configured to vary a valve lift of the intake valve and to vary a valve phase angle of the intake valve by independently and separately operating a variable valve lift mechanism and a variable valve phase angle mechanism, the variable valve phase angle mechanism having a response speed that is slower than a response speed of the variable valve lift mechanism; and
   a controller for controlling the variable valve operating mechanism;
   the controller configured to calculate a first target value corresponding to a combination of the valve lift and the valve phase angle which is desired at a current engine operating condition;
   when an accelerator is in a fully closed position, the controller is configured to calculate a reacceleration estimated value corresponding to a combination of a hypothetical valve lift and a hypothetical valve phase angle based on a current engine rotational speed and an engine operating load estimated to occur upon reacceleration different from the combination of the valve lift and the valve phase angle which is desired at the current engine operating condition;

the controller configured to determine whether or not a minimum clearance between the intake valve and a piston would become less than a permissible value during variation of the valve lift and the valve phase angle from the first target value toward the reacceleration estimated value;

the controller configured to calculate a second target value corresponding to a combination of the valve lift and the valve phase angle at which the engine torque produced is equivalent to the torque produced at the first target value, the minimum clearance remains greater than or equal to the permissible value, and the valve phase angle is more retarded than that of the first target value; and the controller further configured to set the first target value as a control target value, and then switch the control target value from the first target value to the second target value when it is determined that the minimum clearance would become less than the permissible value during variation of the valve lift and the valve phase angle from the first target value toward the reacceleration estimated value, wherein the variable valve operating mechanism starts to vary the actual valve lift and the actual valve phase angle of the intake valve to follow the control target value prior to the reacceleration.

2. The intake air control apparatus according to claim 1, wherein the second target value corresponds to a combination of the valve lift and the valve phase angle which is closest to the valve lift and the valve phase angle corresponding to the first target value, and at which the minimum clearance becomes greater than or equal to the permissible value, from a plurality of values corresponding to combinations of the valve lift and the valve phase angle at which the engine torque produced is equivalent to the engine torque produced at the first target value.

3. The intake air control apparatus according to claim 1, wherein the controller is configured to perform a fuel cutoff to the engine during operation when the accelerator is in the fully closed position, and wherein the controller is configured to switch to the second target value as the control target value while the accelerator is in the fully closed position and a fuel cutoff is being performed.

4. The intake air control apparatus according to claim 1, wherein the controller is configured to calculate the second target value when it is determined that the minimum clearance would become less than a permissible value during variation of the valve lift and the valve phase angle from the first target value toward the reacceleration estimated value.

5. The intake air control apparatus according to claim 1, wherein the controller is further configured to determine whether a braking operation is carried out; and
wherein the controller is configured to maintain the first target value as the control target value when the braking operation is carried out.

6. The intake air control apparatus according to claim 1, wherein the controller is further configured to operate the variable valve lift mechanism and the variable valve phase angle mechanism such that the actual valve phase angle of the intake valve is retarded earlier than the actual valve lift of the intake valve.

7. The intake air control apparatus according to claim 1, wherein the controller is configured to detect the current valve lift as varied by the variable valve lift mechanism and the current valve phase angle as varied by the variable valve phase angle mechanism; and
wherein when the minimum clearance between the intake valve and the piston is determined to be less than the permissible value during variation of the valve lift and the valve phase angle from the first target value toward the reacceleration estimated value, the controller is configured to limit a response speed of the variable valve lift mechanism in accordance with the detected current valve lift and the detected current valve phase angle.

8. A method for controlling an intake valve which regulates intake air to a vehicular internal combustion engine, the engine having a variable valve operating mechanism configured to vary a valve lift of the intake valve and to vary a phase angle of the intake valve by independently and separately operating a variable valve lift mechanism and a variable valve phase angle mechanism, the variable valve phase angle mechanism having a response speed that is slower than a response speed of the variable valve lift mechanism, the method comprising:

calculating a first target value corresponding to a valve lift and a valve phase angle which are desired in a current engine operating condition;

when an accelerator is in a fully closed position, calculating an estimated reacceleration value corresponding to a hypothetical valve lift and a hypothetical valve phase angle at which the intake valve does not contact a piston, wherein the hypothetical valve lift and the hypothetical valve phase angle are based on an estimated load upon reacceleration and a current engine rotational speed different from the valve lift and the valve phase angle which are desired at the current engine operating condition;

determining whether or not a minimum clearance between the intake valve and the piston would become less than a permissible value during variation of the valve lift and the valve phase angle from the first target value toward the reacceleration estimated value;

calculating a second target value corresponding to a combination of the valve lift and the valve phase angle at which the engine torque is equivalent to the engine torque produced at the first target value, the minimum clearance remains greater than or equal to the permissible value, and the valve phase angle is more retarded than that of the first target value; and setting the first target value as a control target value, and then switching the control target value from the first target value to the second target value when it is determined that the minimum clearance would become less than the permissible value during variation of the valve lift and the valve phase angle from the first target value toward the reacceleration estimated value, wherein the variable valve operating mechanism starts to vary the actual valve lift of the intake valve and the actual phase angle of the intake valve according to the control target value prior to the reacceleration.

9. The method according to claim 8, further comprising:
calculating the second target value to correspond to a combination of the valve lift and the valve phase angle which is closest to the valve lift and the valve phase angle corresponding to the first target value, and at which the minimum clearance becomes greater than or equal to the permissible value, from a plurality of values corresponding to combinations of the valve lift and the valve phase angle at which the engine torque produced is equivalent to the engine torque produced at the first target value.

10. The method according to claim 8, further comprising determining whether a braking operation is carried out; and
maintaining the first target value as the control target value when the braking operation is carried out.

11. The method according to claim 8, further comprising:
detecting the current valve lift and the current valve phase angle; and limiting the response speed of the variable valve lift mechanism in accordance with the detected current valve lift and the detected current valve phase angle, when the minimum clearance between the intake valve and the piston is determined to be less than the permissible value during variation of the valve lift and the valve phase angle from the first target value toward the reacceleration estimated value.

12. An intake air control apparatus for controlling an intake valve which regulates intake air to a vehicular internal combustion engine, the intake air control apparatus comprising:

variable valve operating means for varying a valve lift and a valve phase angle of the intake valve by independently and separately operating a variable valve lift means and a variable valve phase angle means, the variable valve phase angle means having a response speed that is slower than a response speed of the variable valve lift means;

first target value calculating means for calculating a first target value corresponding to a combination of the valve lift and the valve phase angle which is desired at a current engine operating condition;

reacceleration estimated value calculating means for calculating, when an accelerator is in a fully closed position, a reacceleration estimated value corresponding to a combination of a hypothetical valve lift and a hypothetical valve phase angle at which the intake valve does not contact a piston, wherein the combination of the hypothetical valve lift and the hypothetical valve phase angle is based on a current engine rotational speed and an engine operating load estimated to occur upon reacceleration different from the combination of the valve lift and the valve phase angle which is desired at the current engine operating condition;

determining means for determining whether or not a minimum clearance between the intake valve and the piston would become less than a permissible value during variation of the valve lift and the valve phase angle from the first target value toward the reacceleration estimated value;

second target value calculating means for calculating a second target value corresponding to a combination of the valve lift and the valve phase angle at which the engine torque produced is equivalent to the torque produced at the first target value, the minimum clearance remains greater than or equal to the permissible value, and the valve phase angle is more retarded than that of the first target value; and setting means for setting the first target value as a control target value, and for then switching the control target value from the first target value to the second target value when the determining means determines that the minimum clearance would become less than the permissible value during variation of the valve lift and the valve phase angle from the first target value toward the reacceleration estimated value, wherein the variable valve operating means starts to the actual valve lift and the actual valve phase angle of the intake valve to follow the control target value prior to the reacceleration.

* * * * *